Figure 1:
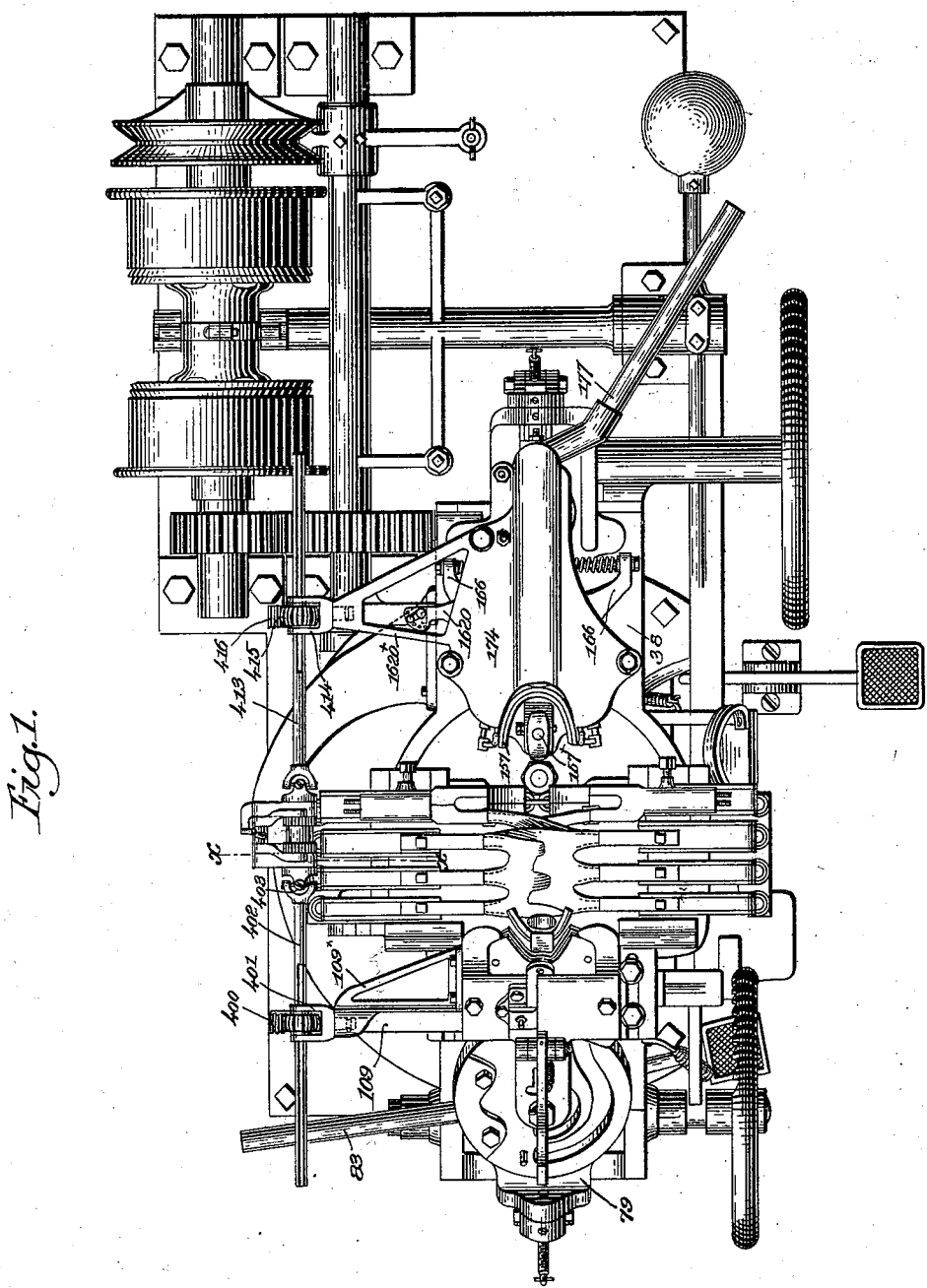

(No Model.) 5 Sheets—Sheet 1.

M. BROCK.
LASTING MACHINE.

No. 601,937. Patented Apr. 5, 1898.

Witnesses: Inventor:
Matthias Brock.
by Crosby & Gregory
Attys.

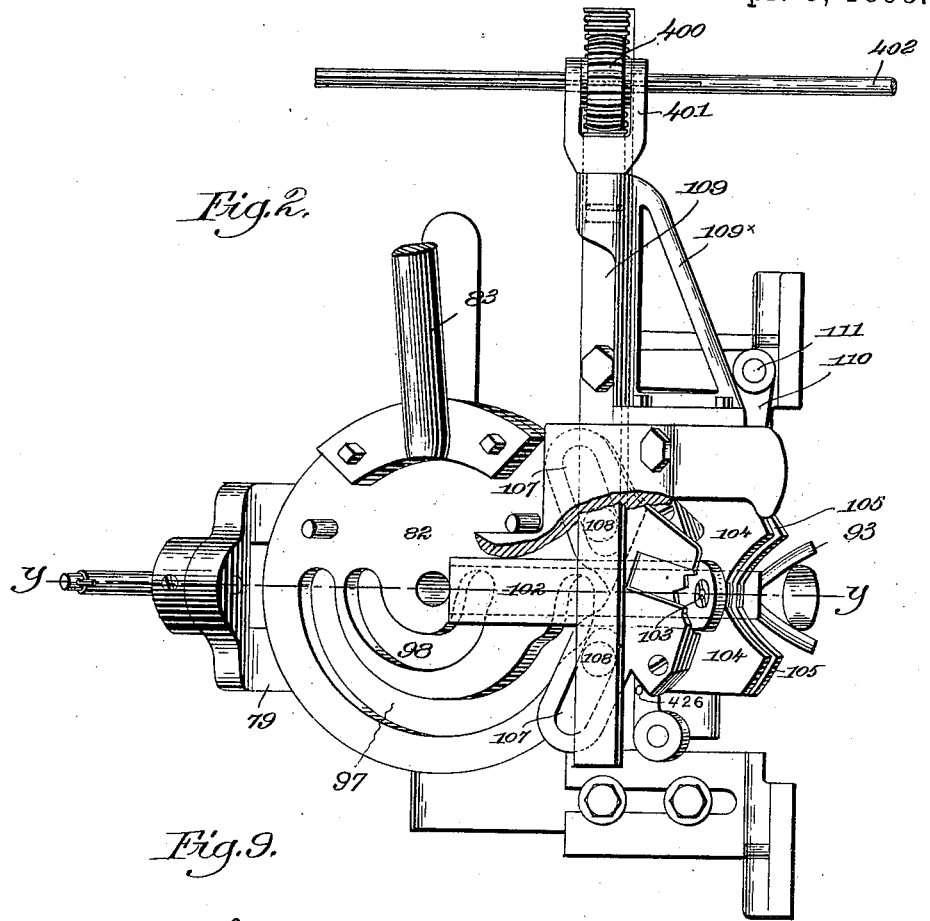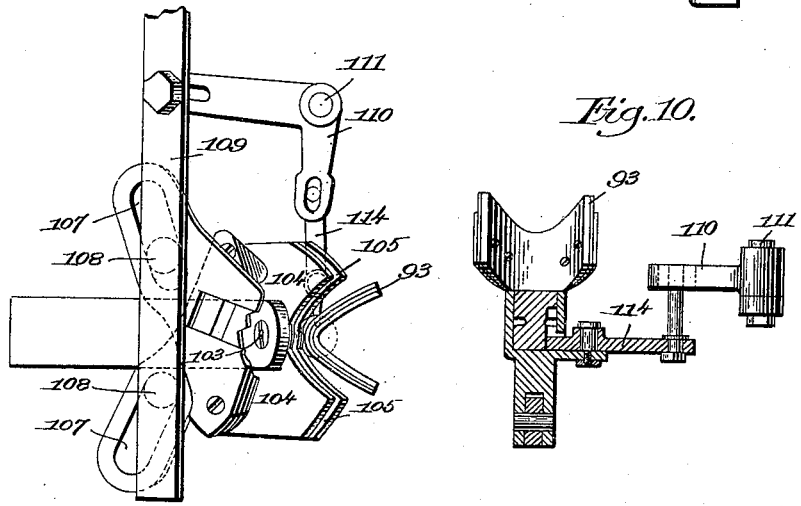

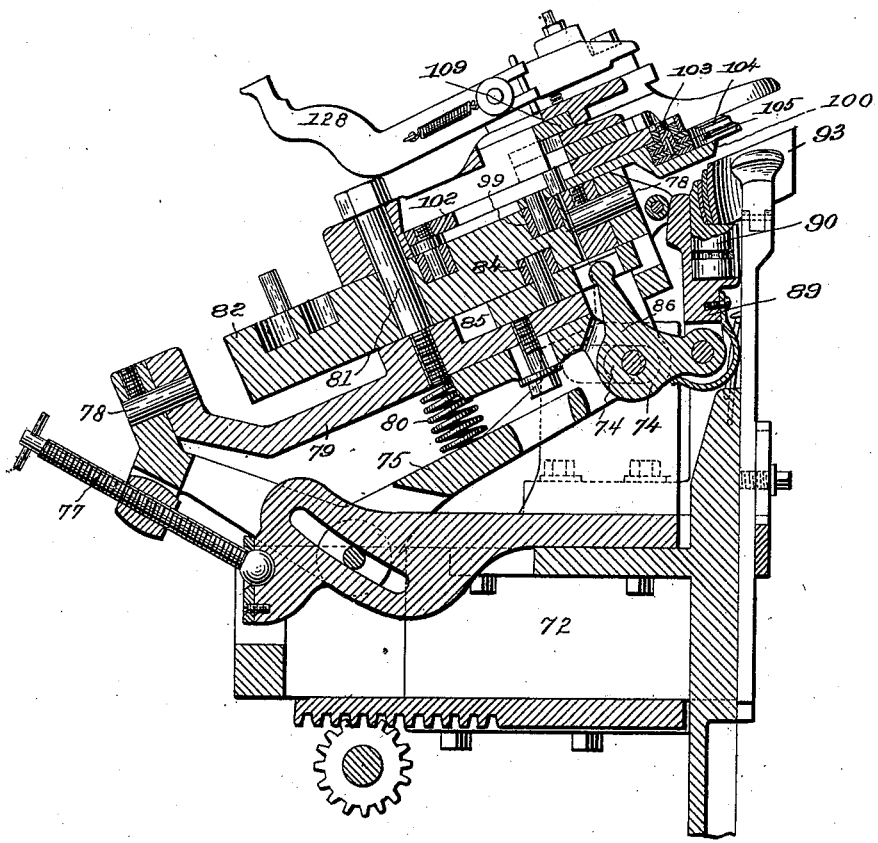

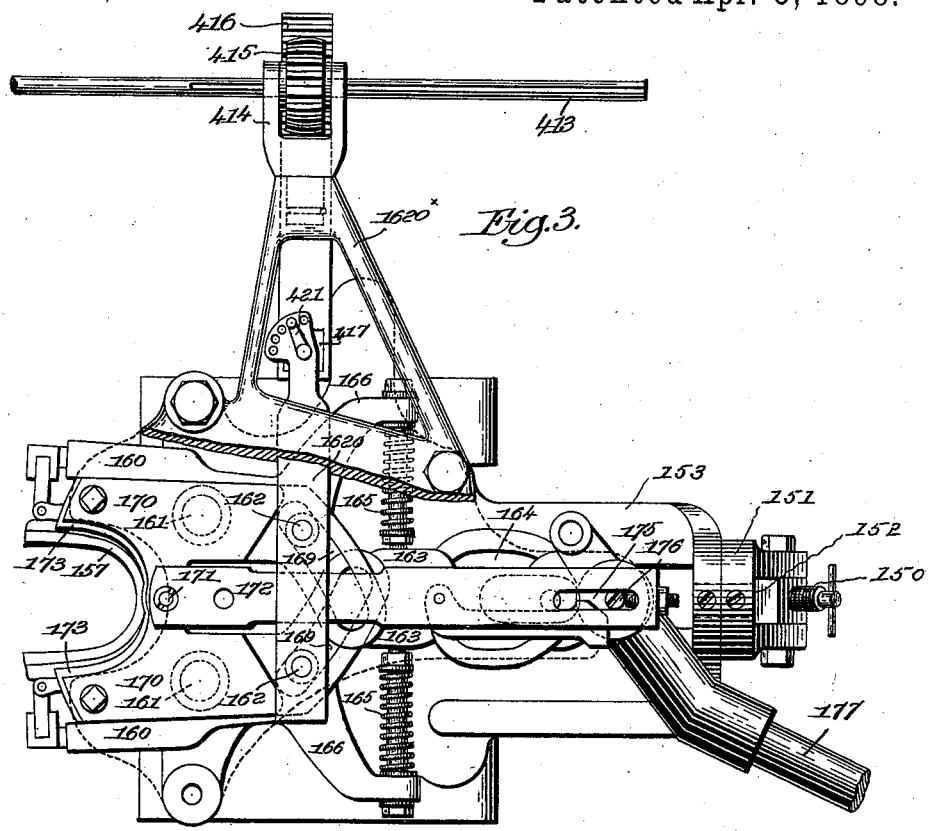
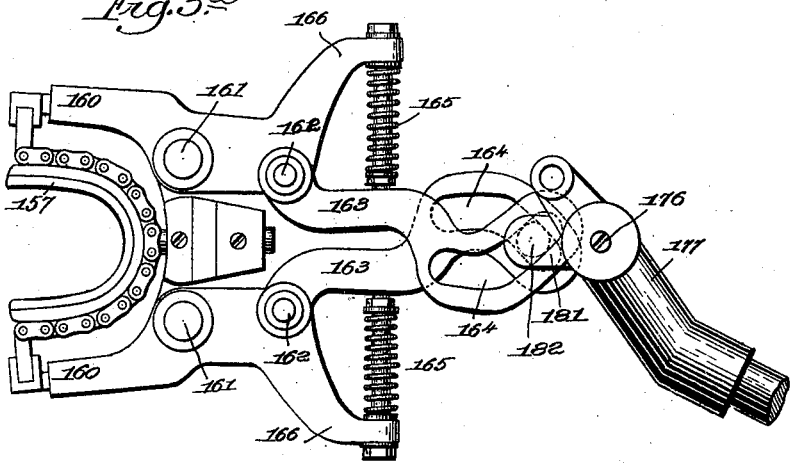

(No Model.)  5 Sheets—Sheet 5.
M. BROCK.
LASTING MACHINE.
No. 601,937. Patented Apr. 5, 1898.
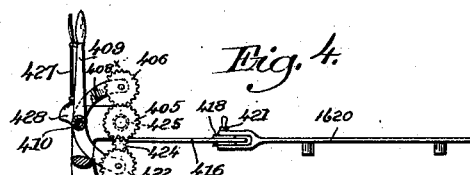
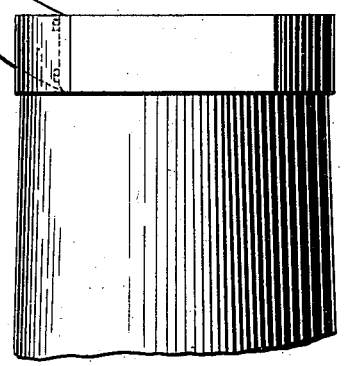
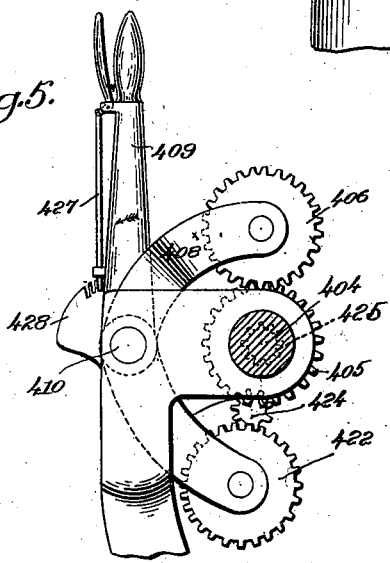
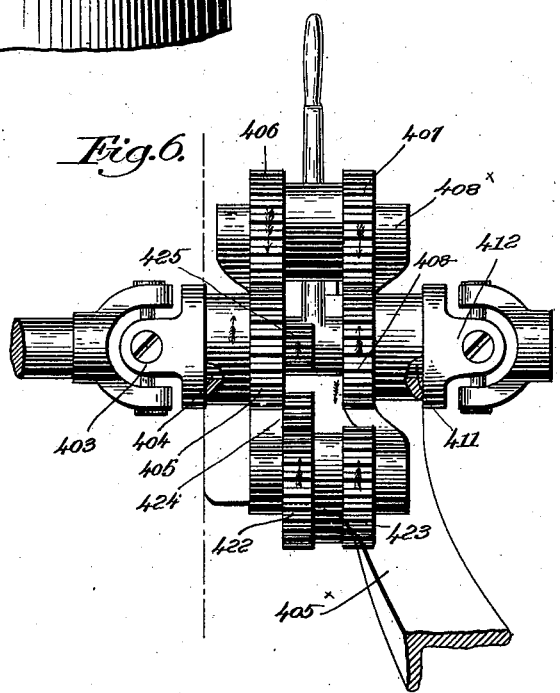
Witnesses:
Fred S. Greenleaf
Thomas J. Drummond
Inventor:
Matthias Brock.
by Crosby & Gregory
Attys.

UNITED STATES PATENT OFFICE.

MATTHIAS BROCK, OF BOSTON, MASSACHUSETTS, ASSIGNOR TO THE CONSOLIDATED & McKAY LASTING MACHINE COMPANY, OF PORTLAND, MAINE.

LASTING-MACHINE.

SPECIFICATION forming part of Letters Patent No. 601,937, dated April 5, 1898.

Application filed August 14, 1897. Serial No. 648,238. (No model.)

*To all whom it may concern:*

Be it known that I, MATTHIAS BROCK, of Boston, county of Suffolk, State of Massachusetts, have invented an Improvement in Lasting-Machines, of which the following description, in connection with the accompanying drawings, is a specification, like figures on the drawings representing like parts.

This invention has for its object to improve machines for lasting boots and shoes, the invention having special reference to machines having side and end lasting devices, as distinguished from machines employing nippers, which progressively engage the edge of the material to be lasted about the last.

The invention further has reference to means for shifting the end lasting devices to the right or to the left, as may be necessary to adapt the same to and to evenly meet the material at the ends of crooked lasts, whether rights or lefts, and having a difference of swing or inclination.

Prior to my invention lasting-machines have been devised wherein the toe and heel lasting devices have been laterally or transversely adjustable for lasts, either rights or lefts, having a difference of swing, and such adjustment has been effected automatically; but in such machines as are known to me the adjustment of the end lasting devices at the toe has been effected independently of the corresponding adjustment of the end lasting devices at the heel, and in such machines it has been possible to automatically position and operate the lasting devices at one end of a last while the lasting devices at the opposite end of the last are still out of alinement with the adjacent end of the last.

While it is not in all cases essential that the end lasting devices at both ends of the last be properly alined with their adjacent ends of the last before any part of the operation of lasting is performed, yet in some instances it is desirable that such alinement of both the toe and heel lasting devices be had before any effective lasting is accomplished.

The principal aim of this my present invention is to provide means for automatically and simultaneously shifting the lasting devices at the toe and heel of a last to adapt the same to the crooked ends of lasts, whether rights or lefts, having a difference in degree of crookedness or swing.

In the drawings, Figure 1 is a top or plan view of a lasting-machine, illustrating my invention; Fig. 2, an enlarged top or plan view of the toe-lasting devices and actuating mechanism therefor, with part of the cap removed to expose some of the working parts; Fig. 2ª, a vertical section of the same on the dotted line $y\, y$; Fig. 3, on an enlarged scale, a plan view of the heel-lasting devices; Fig. 3ª, a detail showing some of the parts of Fig. 3; Fig. 4, a cross-sectional detail on the dotted line $x\, x$, Fig. 1; Fig. 5, a detail part of Fig. 4 on an enlarged scale; Fig. 6, a right-hand side view of Fig. 5; Figs. 7 and 8, edge and top views, respectively, of one form of means for varying the movement of the end lasting devices at one end of the last relatively to the movement of the devices at the opposite end of the last; and Figs. 9 and 10, details to be referred to.

In the embodiment of my invention selected for present illustration herein the lasting-machine as a whole may be of any usual or well-known type. In the illustration of the drawings, however, the parts which alone are necessary to an understanding of this invention will be described in detail.

Referring to the drawings, the table 38 has mounted upon it at one end—for example, at the left—the longitudinally-sliding carriage 72, carrying the tipping-plate holder 75, arranged to tip about the horizontal transverse pivot 74 (shown in dotted lines, Fig. 2ª) and adjustable by means of the adjusting-screw 77, said holder carrying upon the axle trunnions or pins 78 the tipping plate 79, to which is pivoted upon the stud 81 the dial-operating cam 82, provided with a suitable operating-handle 83. This operating-cam 81, at its under side, has a cam-slot for the reception of the roller-stud 84, which actuates the slide-bar 85, and thereby, through the bell-crank lever 86, imparts a rising-and-falling movement to the toe-pad-supporting bar 89, in the upper end of which is journaled the shank 90 of the toe wiper or pad 93.

The toe-wipers proper are indicated at 104, they being shown of the common plate type, pivoted at 103 to a longitudinally-movable slide-bar 102, having a roller-stud (not shown) arranged to travel in a cam-slot 98 in the operating-cam 82 referred to, rotation of said cam causing forward-and-back movement of the said slide-bar, the latter carrying with it the pivot 103 and the wipers 104 and the carriers 105, to which said wipers are suitably attached.

The wiper-carriers 105 are provided with rearwardly-extended tail portions, which cross each other like a pair of shears and are provided, respectively, with slots 107, which receive roller-studs 108, depending from the transverse slide-bar 109, to be referred to. It is obvious that with the said slide-bar restrained from transverse sliding movement forward-and-back movement of the toe-wiper plates by the slide-bar 102 and cam referred to will cause said studs 108, working in the slots 107, to open and close the wiper-plates like a pair of shears during their backward-and-forward movement referred to.

The operating-cam 82 has a second slot at its upper side, (indicated at 97,) which receives the roller-stud 99 to actuate the forward-and-back reciprocating abutment 100.

Springs 80 maintain the tipping plates and the parts carried thereby normally in an even or level position, yet permit the said plate and parts to be tipped as necessary to enable the wiper-plates properly to meet the plane of the bottom of the toe end of the last when positioned in a machine.

The usual downhold 128 is indicated in Fig. 2$^a$.

The shank 90 of the toe-pad 93 is vertically slotted at its side to receive the short end of a lever 114, (see Figs. 2, 9, and 10,) the upper end of which lever is jointed to an arm 110 of the bell-crank lever, pivoted at 111, and having its other arm slotted and jointed, as shown in Fig. 9, to the said slide-bar 109 referred to, so that as the toe-wiper is raised by the bell-crank lever 74 referred to and meets the toe of the last or the shoe thereupon it will swivel about the axis of its shank 90 until it conforms in its alinement or angular position with the alinement or swing of the toe end of the last, the swiveling movement of the toe-wiper being communicated by the levers 114 and 110, referred to, to the slide-bar 109, sliding the latter transversely of the machine and shifting the studs 108, to thereby swing the tails of the wiper-carriers and the wipers to one side or to the other into position corresponding to the position of the toe-wiper and in proper correspondence with the end of the last, whatever be the swing of the latter. All this will be understood by those skilled in the art without further description herein.

Referring now to Figs. 1, 3, and 3$^a$, illustrating the heel-lasting devices, the table 38 carries a tipping-plate holder, the rear end only of which is indicated at 151, it being generally similar to that described with reference to the toe-lasting mechanism, an adjusting-screw 150 furnishing means for vertically adjusting the tipping holder. In the tipping-plate holder is mounted to swing about longitudinal pivots, one of which is shown in dotted lines 152, the tipping plate 153, which carries the heel-lasting devices proper. These heel-lasting devices are of a type which will be recognized readily by those familiar with lasting-machines.

In Figs. 3 and 3$^a$ the heel clasp or band is indicated at 157, mounted in the ends of the positioning devices 160, pivoted at 161, having jointed to them the actuating-lever 163, diagonally slotted at 164 to receive the rollers 182, moved by the operating-lever 177. When this operating or handle lever 177 is moved to the left, Fig. 3, the rollers referred to will act in the diagonal slots 164 to move the ends of the positioning devices toward each other to cause the heel-band to grip the heel of the last, and if the said heel-band has not been already positioned previous to movement of the operating-handle then the said band when closed upon the heel will position itself—that is, adapt itself to the swing of the heel end of the last.

It is obvious that if either end of the heel-band meets the side of the last in advance of the other it will be stopped in its movement, and the entire movement of the actuating parts will thereafter be occupied in moving the other end of said heel-band until it also meets its side of the last, the swinging link 181, carrying the roller 182 referred to, permitting the said roller in its forward movement also to swing from side to side to cause the opening and closing of the positioning devices and heel-band to be divided equally between the two systems of levers or parts or to be imparted entirely to one series when the other is stopped by meeting the last in advance of its corresponding part of the other series. In other words, so long as the two ends of the heel-band can move uniformly toward the last the roller 182 will advance in a substantially direct line; but when either end of the clasp meets the last in advance of the opposite end then the continued forward movement of the roller 182 will operate as before to move the ends of the heel-band toward each other; but the movement will be wholly by that end which has not yet reached the last, and only when both ends have met the last will the movement thereafter be equalized, so that both ends will be uniformly pressed against the sides of the heel end of the last to clamp the latter in position.

The pivot-studs 162, by which the levers 163 are jointed to the positioning devices 160, are extended vertically and are attached to the transversely-sliding bar 162$^a$, and between the said levers 163 and said slide-bar the roller-studs referred to are passed through the diagonal slots 169 in the tail ends of the heel-wiper carriers 170, pivoted at 171 to the longitudinal sliding bar 172, and carrying the heel-wipers proper, 173, so that as the heel-band in adapting itself to the swinging end of a right or a left last is turned to face first in one angular direction and then in another the corresponding transverse shifting of the pivots 162 will shift the slide-bar 1620 transversely of the machine, and so the stud-pivots 162, acting in the diagonal slots of the wiper-carriers also will shift the said wiper-carriers and their wipers into a position corresponding to the position of the heel-band, and therefore facing properly to act evenly upon the material at the heel end of the last in whichever direction it may swing by reason of the crookedness of the last. From this position the wipers are opened and closed in well-known manner by the forward-and-back movement imparted to them by the slide-bar 172, which is actuated by a pin 176, playing in a slot 175 in the slide-bar, the pin being carried by the operating or handle lever 177.

Springs 165, interposed between the tail ends 166 of the positioning devices 160, tend normally to center the several parts and return them to normal position after they have been shifted.

Referring now particularly to Figs. 1, 4, 5, and 6, the slide-bar 109 is supported at its outer end in a suitable bracket 109$^\times$, secured to the tipping plate 79 of the toe-head, the said slide-bar at its outer end being provided at its upper side with teeth, constituting a rack, which mesh with the pinion 400, journaled in the yoke 401, swiveled for rotatable movement in the bracket or arm 109$^\times$ referred to. This pinion 400 is splined upon a shaft 402, which is made to slide freely through the hub of said pinion and is supported by the yoke 401. At its end adjacent the middle of the machine the shaft 402 is connected by a universal joint 403 with a short shaft 404, journaled in one of the arms of the yoke-like support 405$^\times$, mounted on the standard of the machine. At its inner end this short shaft 404 is provided with a gear-wheel 405, normally in mesh with the gear 406, rigidly secured to a companion gear 407, which with the gear 406 are freely journaled in one arm of a yoke 408$^\times$, fast on a lever 409, pivotally mounted at 410 in the said arm or support 405$^\times$. The gear 407 is in turn in mesh with a mating gear 408, fast on a second short shaft 411, journaled in the other arm of the forked support 405$^\times$ and connected by universal joint 412 with the shaft 413, similar to the shaft 402 referred to. This shaft 413 is supported in the two arms of a yoke-like bearing 414, swiveled in the end of an arm 1620$^\times$ on the cap 174 of the heel-head. A pinion 415, arranged between the arms of the yoke-like bearing 414, is splined upon the shaft 413 and meshes with the rack 416, connected with the slide-bar 1620, controlling the position of the heel-wipers, as heretofore described.

The swiveling of the yokes 401 and 414 permits the tipping plates of the two heads of the machine to be rolled and tipped, as necessary, to meet the roll and spring of the last and still maintain proper bearings for the shafts 402 and 413, and the teeth of the pinions 400 and 415 are rounded somewhat at their crowns to maintain proper engagement with their respective racks when the said tipping plates are rolled or tipped.

Referring now to Figs. 7 and 8, the end of the rack 416 is provided with a preferably rectangular aperture 417 to receive the flattened head 418 of the short shaft 419, mounted in the forked end of the slide-bar 1620 referred to, the short shaft 419 having a preferably resilient crank-arm 421, with a projection at its end adapted to engage one or another of the recesses 421$^\times$ in said slide-bar and by means of which the flattened head 418 may be turned into one or another adjusted position to vary the amount of lost motion between its ends and the opposite walls of the aperture 417, thereby providing means by which to vary the movement of the bar 1620 and rack 416 one by the other, as will be described.

Referring now again to Figs. 5 and 6, the lower arm of the yoke 408$^\times$ on the levers 409 carries a short shaft, on which are fixed the toothed wheels 422 and 423, the former being in mesh with a smaller pinion 424, also journaled in the said arm on said yoke and arranged opposite but normally out of engagement with a pinion 425, fast on the short shaft 404, to which the gear 405 is affixed.

The operation of the apparatus as thus far described is as follows: Assuming a crooked last to be placed in position in the machine and supported upon the usual heel-pin 157$^\times$, if by reason of the swing of the last the toe end thereof does not correspond in its alinement with the alinement of the toe-pad and the toe-lasting devices the operator when he moves the handle-lever 83 to actuate the toe-lasting devices first raises the toe-pad 93, and as the latter meets the toe end of the last it will swing, as described, to adapt itself in alinement to the alinement of the end of the last, and by so doing will slide the bar 109 in the direction of its length to automatically position the toe-lasting devices or wipers, also in proper position, to act upon the end of the last, whatever be its swing. This automatic adjustment of the toe-lasting devices to meet the swing of the last also acts through the rack on the outer end of the slide-bar 109, pinion 400, shaft 402, gears 404, 406, 407, and 408, the shaft 413, pinion 415, rack 416, and slide-bar 1620 to also move the heel-lasting devices or plates and the heel-band into proper position to act upon the adjacent end of the last. Crooked lasts usually present a gradual swing from toe to heel, the toe standing in one angular direction and the heel in an opposite angular direction, and as the proportional swing of the heel as compared with the toe is usually about the same in different styles of lasts it is perfectly clear that by proper adjustment of the parts the automatic positioning of the toe-lasting devices, as described, may be caused to simultaneously and automatically properly position the heel-lasting devices for the heel end of the same last. If, however, a last should be encountered wherein the direction of swing at the heel is the same as the direction of swing at the toe, the operator will throw the lever 409 in the direction of the arrow, Fig. 5, and thereby disengage the gears 406 407 from the gears 405 408 and by the same movement throw the pinion 424 and the gear 423 into engagement, respectively, with the pinion 425 and the gear 408, so that thereafter any adjustment of the toe-lasting devices to meet the swing of the last will in rotating the shaft 402 in the same direction as before now operate to rotate the shaft 413 in an opposite direction from before to swing the heel-lasting devices into position having the same angular direction as the swing of the toe-lasting devices.

Whatever be the direction of movement of the heel-lasting devices by the toe-lasting devices, the extent of such movement is readily variable by means of the crank-arm 421, which varies the lost motion between the rack 416 and slide-bar 1620, as described. The mechanism described is also capable of automatically moving or adjusting the toe-lasting devices by or from the heel-lasting devices if it be the practice to operate the latter in advance of the former. In other words, my invention comprehends the simultaneous and automatic shifting of both the toe-lasting devices and the heel-lasting devices to meet the swing of the last on operation of the machine for lasting. This shifting of the plates when the mechanism is properly adjusted is necessarily accurate, or substantially so, and requires no attention on the part of the operator when lasting.

When the toe-lasting plates are withdrawn at the end of the lasting operation and after the last has been released from the side lasting devices, stop-pins 426 act to center the toe-lasting devices and through the mechanism described also center the heel-lasting devices, so that should the next last operated upon chance to have an opposite swing the automatic movement will be simply from the central position to one side instead of from the opposite side to that side.

The lever 409, by which the change in the direction of swing may be effected, is preferably provided with suitable well-known locking mechanism, such as indicated at 427, cooperating with the toothed sector 428, by which to lock the said sector and the parts in either one of the adjusted positions.

The gears 406 407 and 422 423 are preferably so far separated by the yoke 408$^\times$ as to enable the lever 409 when centrally positioned to hold all the said gears from engaging the gears on the shafts 404 411, thereby disconnecting the shafts 402 413 and leaving the toe and heel lasting devices independently adjustable wherever it becomes desirable to so do.

I have herein described my invention in connection with one embodiment thereof only, it being of course understood that my invention is not limited to this embodiment alone; nor is it limited in its application to any particular lasting-machine.

So far as known to me I am the first so to connect or actuate the toe and heel lasting devices that they will be automatically laterally adjustable to meet the swings of different lasts substantially together or simultaneously instead of independently, as heretofore, whatever mechanism may be employed in doing it.

In the claims by the phrase "laterally adjustable," as applied to the end lasting devices, is meant that lateral adjustment or shifting of the plates which is necessary to adapt the same to the swing of the last, whether it be a right or a left.

Having fully described my invention, what I claim, and desire to secure by Letters Patent, is—

1. A lasting-machine containing automatically laterally adjustable toe-lasting devices, and automatically laterally adjustable heel-lasting devices, and connections between the two, whereby automatic lateral adjustment of the toe-lasting devices causes corresponding lateral adjustment of the heel-lasting devices, and vice versa.

2. A lasting-machine containing automatically laterally adjustable toe-lasting devices, and automatically laterally adjustable heel-lasting devices, and connections between the two, whereby automatic lateral adjustment of the toe-lasting devices causes corresponding lateral adjustment of the heel-lasting devices.

3. A lasting-machine, containing laterally-adjustable toe-lasting devices, and laterally-adjustable heel-lasting devices, and means simultaneously and automatically to adjust said heel and toe lasting devices.

4. In a lasting-machine, the combination with automatically laterally adjustable toe-lasting devices, and automatically laterally adjustable heel-lasting devices, of devices connecting said toe and heel lasting devices, whereby one is automatically actuated by the other, and means whereby the direction of automatic movement of one by the other may be changed as necessary.

5. In a lasting-machine, the combination with the tipping and rolling toe-lasting devices, and tipping and rolling heel-lasting devices, of means for simultaneously automatically and laterally adjusting the said toe-lasting devices and heel-lasting devices to meet the swing of a last.

6. In a lasting-machine, the combination with the toe-lasting plates and the heel-lasting plates, and actuating means therefor, of means to adjust laterally the said toe and heel lasting plates automatically and simultaneously to meet varying swings of lasts.

7. In a lasting-machine the combination with the toe-lasting devices, and heel-lasting devices adjustable one toward the other to meet lasts of different lengths, of means for automatically, simultaneously and laterally adjusting said toe and heel.

8. In a lasting-machine, the combination with the automatically laterally adjustable toe-lasting devices, and the automatically laterally adjustable heel-lasting devices, of connections between the two for operating the one by or with the other, and means to vary the extent of movement of one by or with the other.

9. In a lasting-machine, the combination with the laterally-adjustable toe-lasting devices, and laterally-adjustable heel-lasting devices, of means including two shafts connecting the said toe and heel lasting devices for movement of one by or with the other, and means to vary the direction of movement of one of said shafts by or from the other.

10. A lasting-machine, containing laterally-adjustable toe-lasting devices, and laterally-adjustable heel-lasting devices, means for simultaneously and automatically adjusting the said toe and heel lasting devices laterally to meet varying swings of lasts, and means to disconnect said toe and heel lasting devices to enable them to be independently operated when desired.

11. In a lasting-machine containing a support for a last, and toe-lasting devices and heel-lasting devices, combined with means for automatically and simultaneously adjusting said toe and heel lasting devices laterally into positions automatically determined by a last on said support.

12. In a lasting-machine, the combination with a support for a last, of toe-lasting devices and heel-lasting devices, and means set in operation by contact with the last or the material thereupon automatically to shift said toe and heel lasting devices laterally.

13. In a lasting-machine, the combination with a support for a last, of toe and heel lasting devices and a toe-clasp, and means to move the same relatively to the said last upon said support, and connections between the said toe-clasp and lasting devices automatically to shift the latter laterally by or from the former.

14. In a lasting-machine, the combination with toe and heel lasting devices, and a support for a last, of a heel-clasp, and means to move the same relatively to and in coöperation with a last upon the said support, and connections between said heel-clasp and lasting devices automatically to shift the latter laterally by or from said clasp.

15. A lasting-machine, containing laterally-adjustable toe-lasting devices, and laterally-adjustable heel-lasting devices, and connections between the two, whereby automatic lateral adjustment of the one causes corresponding adjustment of the other.

16. A lasting-machine, containing laterally-adjustable toe-lasting devices, and laterally-adjustable heel-lasting devices, and connections between the two, whereby automatic lateral adjustment of the one causes corresponding adjustment of the other, and means for changing the direction of such adjustment of the one by automatic adjustment of the other.

17. In a lasting-machine, the combination with toe and heel lasting devices, and toe and heel clasps or pads, of means connecting said toe-clasp with said heel-lasting devices for laterally shifting the latter by or from the former.

18. In a lasting-machine, the combination with toe and heel lasting devices, and toe and heel clasps or pads, of means connecting said heel-clasp with said toe-lasting devices for laterally shifting the latter by or from the former.

19. In a lasting-machine, the combination with toe and heel lasting devices, of means coöperating with one end of the last to laterally shift the lasting devices at the opposite end of the last.

20. In a lasting-machine, the combination with a support for a last, and toe and heel lasting devices, of a rising-and-falling toe-clasp, and connections between the same and the said toe and heel lasting devices for laterally adjusting the latter by the former.

In testimony whereof I have signed my name to this specification in the presence of two subscribing witnesses.

MATTHIAS BROCK.

Witnesses:
 FREDERICK L. EMERY,
 LAURA T. MANIX.